(12) United States Patent
Findeisen

(10) Patent No.: US 9,158,651 B2
(45) Date of Patent: Oct. 13, 2015

(54) MONITORING THREAD STARVATION USING STACK TRACE SAMPLING AND BASED ON A TOTAL ELAPSED TIME

(75) Inventor: Piotr S. Findeisen, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 13/560,401

(22) Filed: Jul. 27, 2012

(65) Prior Publication Data

US 2014/0033206 A1    Jan. 30, 2014

(51) Int. Cl.
*G06F 9/46* (2006.01)
*G06F 11/34* (2006.01)

(52) U.S. Cl.
CPC ........ *G06F 11/3414* (2013.01); *G06F 11/3466* (2013.01); *G06F 2201/865* (2013.01)

(58) Field of Classification Search
None
See application file for complete search history.

(56) References Cited

U.S. PATENT DOCUMENTS 7,243,267 B2  7/2007  Klemm et al.
7,849,463 B2  12/2010 Ginsberg
2005/0102677 A1  5/2005  Gootherts
2006/0031837 A1* 2/2006  Theurer ........................ 718/100
2008/0244576 A1  10/2008 Kwon et al.
2009/0204948 A1  8/2009  Krauss

OTHER PUBLICATIONS

Zhang et al.; A Real-Time Performance Comparison of Distributable Threads and Event Channels, Proceedings of the 11th IEEE Real Time and Embedded Technology and Applications Symposium (RTAS'05) 1080-1812/05, Mar. 7-10, 2005.*
Waddington, D.G. et al. "Dynamic Analysis and Profiling of Multi-threaded Systems." <dre.vanderbilt.edu/~schmidt/PDF/DSIS_ChapterWaddington.pdf>. Received Jun. 26, 2012. 32 pages.

* cited by examiner

*Primary Examiner* — Meng An
*Assistant Examiner* — Bing Zhao
(74) *Attorney, Agent, or Firm* — Brooks, Cameron & Huebsch, PLLC

(57) ABSTRACT

The present disclosure includes methods and systems for monitoring thread starvation. A number of embodiments include determining an amount of time a thread is not runnable, determining an amount of CPU consumption time for the thread, and determining an amount of thread starvation time based on the amount of time the thread is not runnable and the amount of CPU consumption time for the thread.

14 Claims, 3 Drawing Sheets

MONITORING THREAD STARVATION USING STACK TRACE SAMPLING AND BASED ON A TOTAL ELAPSED TIME

BACKGROUND

Applications can use multiple threads to handle the workload on a server. There can be hundreds or thousands of active threads on a server, which can attempt to use more central processing unit (CPU) resources than are available to operate at a given time. When a thread is runnable, but not able to be run, thread starvation occurs. Thread starvation can occur when a thread is temporarily incapable of making progress due to a temporary lack of necessary resources, such as CPU resources, for example.

DETAILED DESCRIPTION

Figure 1:
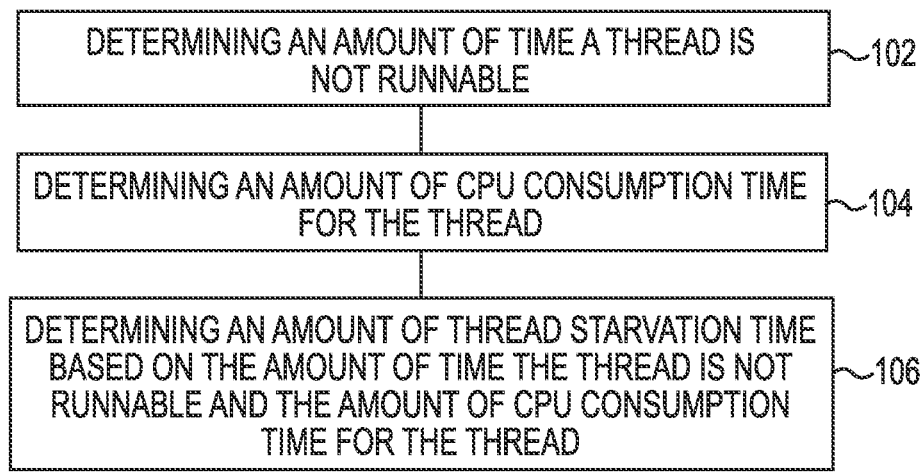
FIG. 1 is a flow chart illustrating an example of a method for monitoring thread starvation properties according to the present disclosure.

In some examples, applications can use a number of threads to handle the workload received by a number of users on a network. The number of active threads associated with a number of applications can be dependent on the type of application and the workload on the applications. In some examples, there can be hundreds or thousands of active threads on applications and the number of active threads can cause thread starvation. Thread starvation can occur when the available CPU resources cannot handle the number of active threads simultaneously. Another cause of thread starvation can be inefficient and/or incorrect thread scheduling due to the language-specific runtime systems and the operating system (OS) kernel sharing thread scheduling responsibilities. Also, virtualization, such as in cloud computing, for example, can cause thread starvation due to applications scheduling threads on emulated CPUs, while the threads are scheduled and run on actual CPUs.

Previous approaches of monitoring thread starvation included attempting to find a cause of thread starvation after a performance issue caused by thread starvation had been detected. Thread starvation detection included monitoring CPU consumption for saturation and/or near-saturation conditions.

In a number of embodiments, thread starvation can be monitored by determining the amount of time a thread is not runnable and the amount of CPU consumption time for the thread. The amount of time a thread is not runnable and the amount of CPU consumption time for the thread can be subtracted from a total elapsed time in a particular time period to determine the amount of thread starvation for the thread.

The present disclosure includes methods and systems for monitoring thread starvation. A number of embodiments include determining an amount of time a thread is not runnable, determining an amount of CPU consumption time for the thread, and determining an amount of thread starvation time based on the amount of time the thread is not runnable and the amount of CPU consumption time for the thread.

In a number of embodiments of the present disclosure, the amount of time a thread is not runnable can be determined by instrumentation to detect when the thread is blocked on a lock and by stack trace sampling to estimate the amount of time the thread state has caused the thread to be not runnable.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method for monitoring thread starvation according to the present disclosure. At 102, an amount of time a thread is not runnable is determined. A thread can be in a starving state when it is runnable, but not running. For a particular time period, a thread can be considered runnable if it is not known otherwise. Therefore, during a particular time period, determining not runnable time for the thread can be used as part of determining thread starvation, e.g., when a thread is runnable, but not running.

In some examples, a thread can be determined to be not runnable when the thread is in a thread lock. Instrumentation can be provided to determine when a thread is in a thread lock. The instrumentation can be used to monitor and report when the thread is not runnable due to being in a thread lock.

In some examples, a thread can be determined to be not runnable when thread stack sampling determines that the thread state caused the thread to be not runnable. Thread stack sampling can periodically determine thread state for the thread and these determinations can be used to estimate the time the thread was not runnable due its thread state. Also, missing samples during thread stack sampling can indicate that the thread was runnable, and possibly starving. Therefore, missing samples during thread stack sampling can be used to estimate the amount of time the thread was not runnable.

At 104, an amount of CPU consumption time for thread is determined. A thread can be in a starving state when it is runnable, but not running. Therefore, during a particular time period, determining CPU consumption time, e.g., the time that the thread was running, for the thread can be used as part of determining thread starvation, e.g., when a thread is runnable, but not running.

In some examples, an amount CPU consumption time for a thread can be determined from the runtime environment, such as the OS and/or a Java virtual machine, for example. A Java application programming interface (API) can be used to monitor and report the amount of CPU consumption time for a thread.

At 106, an amount of thread starvation time is determined based on the amount of time the thread is not runnable and the amount of CPU consumption time for the thread. The amount of thread starvation can be determined by subtracting the amount to time a thread is not runnable and the amount of CPU consumption time for a thread over a particular time period from the total elapsed time of the particular time period.

In some examples, threads can be monitored continuously for thread starvation, while a calculation of the amount of thread starvation can be for a particular time period. For example, a calculation of thread starvation can be for a 1 second time period that thread was being monitored to determine the amount of thread starvation during the 1 second time period.

In some examples, a calculation to determine the amount of thread starvation can use the amount of time the thread was not runnable. Instrumentation can be used to determine that the thread was not runnable for 150 milliseconds (ms) due being in a lock during a 1 second time period. The determination that the thread was in a lock and not runnable for 150 ms can be used in a calculation of the amount of thread starvation. Stack trace sampling can be used estimate that the thread was not runnable for 200 ms due to the thread being in a thread state that was not runnable during the 1 second time period. Also, the process of stack trace sampling can be missing samples that are used to estimate the thread was not runnable for 50 ms during the 1 second time period. The estimate that the thread was not runnable for 250 ms using stack trace sampling can be used in a calculation of the amount of thread starvation.

In some examples, a calculation to determine the amount of thread starvation can use the amount of CPU consumption time for the thread. A Java API can be used to determine that the thread used 100 ms of CPU consumption time during the 1 second time period. The determination that the thread used 100 ms of CPU consumption time can be used in a calculation of the amount of thread starvation.

In some examples, a calculation to determine the amount of thread starvation can include subtracting the amount of time the thread was not runnable and the amount of CPU consumption time from a particular time period. For example, the particular time period can be the 1 second time period. The calculation to determine the amount of thread starvation during the 1 second time period can include subtracting the 150 ms that the thread was not runnable due to being in a lock, the 250 ms that the thread was estimated to be not runnable using stack trace sampling, and the 100 ms of CPU consumption time from the 1 second time period. This calculation results in the amount of thread starvation during the 1 second time period to be 500 ms. The amount of thread starvation can also be reported as a percentage, where thread starvation is 50% during the 1 second time period.

Figure 2:
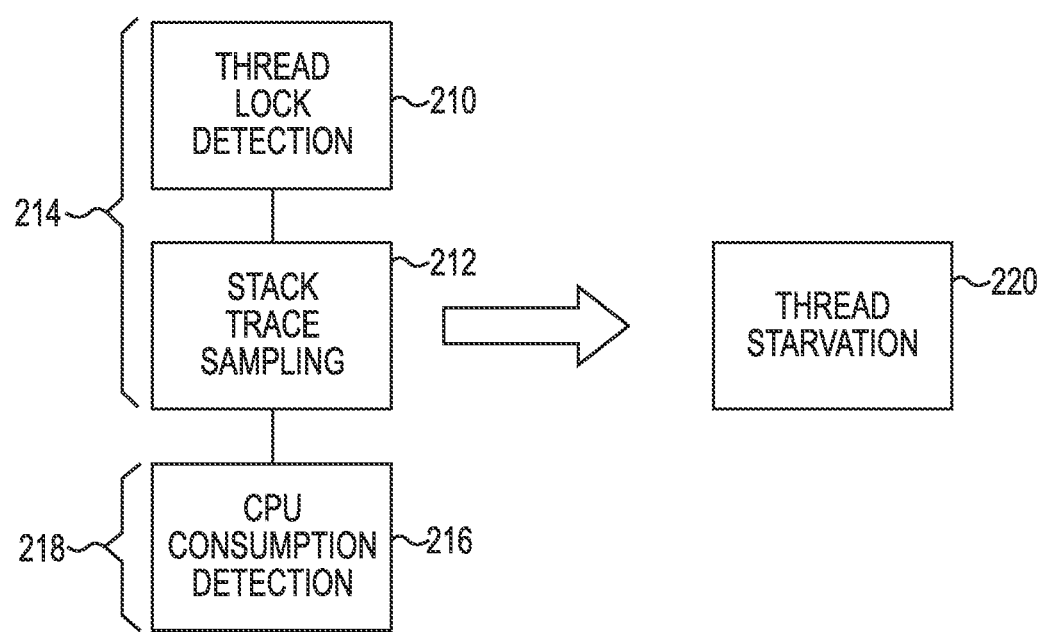
FIG. 2 illustrates a diagram of an example system for providing a simulated network according to the present disclosure.

FIG. 2 illustrates a block diagram of an example system for monitoring thread starvation according to the present disclosure. The system can include thread lock detection 210, stack trace sampling 212, and CPU consumption detection 216 used to determine thread starvation 220. Thread lock detection 210 and stack trace sampling 212 can be used to determine the amount of not runnable time for a number of threads 214. CPU consumption detection 216 can be used to determine the amount of CPU consumption time for a number of threads 218. Thread starvation 220 can be determined based on the amount of not runnable time for a thread 214 and the amount of CPU consumption time for a thread 218. For example, thread starvation 220 can be determined by subtracting the amount of not runnable time for a thread 214 and the amount of CPU consumption time for a thread 218 from a total amount of time of a particular time period. Thread starvation 220 can be calculated over a particular time period and can be recorded and monitored as a length of time and/or as a percentage of the particular time period. For example, the amount of thread starvation for each thread of a number of threads can be reported as a unit of time, such as 150 ms over a 2 second time period, or as a percentage of time, such as 7.5% of a particular time period, for example. Thread starvation 220 can also include information such as the time, day, month, and year that thread starvation occurred.

In some examples, thread starvation 220 can be reported to a user. Thread starvation reports can include the amount of thread starvation of a number of threads over a particular period of time that is of interest to the user based on a request from the user. For example, a user may request the amount of thread starvation of a number of threads from 1 pm to 2 pm on Apr. 15, 2012. Also, thread starvation reports can sent to a user at period intervals that report the amount of thread starvation in the time since the previous thread starvation report was sent to a user. For example, a thread report can be sent to a user every 5 minutes that includes the amount of thread starvation of a number of threads during the previous 5 minutes. In some examples, thread starvation can be continuously monitored and reported to a user.

In some examples, the amount of not runnable time for a thread 214 can include the amount of time the thread is in a lock as determined by thread lock detection 210 and the amount of time the thread is in a not runnable thread state as determined by stack trace sampling 212.

Thread lock detection 210 can include instrumentation to determine, monitor, and/or report when the thread is not runnable due to being in a thread lock. Thread lock detection 210 can detect an entry event into a lock, e.g., lock acquisition attempt, and an exit event out of a lock, e.g., actual lock acquisition, to determine the amount of not runnable time a thread spend in the lock.

Stack trace sampling 212 can include sampling each thread to determine the thread state, such as runnable and/or not runnable, of each thread at periodic intervals. Stack trace sampling 212 can determine if the thread is in a blocked state that is causing the thread to be not runnable by reading only the top most stack frame of each thread, therefore the stack frames below the topmost stack frame do not need be read during stack trace sampling 212 The top most stack trace frame represents the currently executing Java method and since the set of Java APIs causing the thread to block is known, the currently executing method name, e.g., corresponding to an input/output (IO) operation, can be used to determine thread state. Stack trace sampling 212 can sample thread state at periodic intervals, such as once every 100 ms, for example. Stack trace sampling 212 can include estimating the amount of time the thread is not runnable during a particular time period based on the samples that indicate the thread state.

Figure 3:
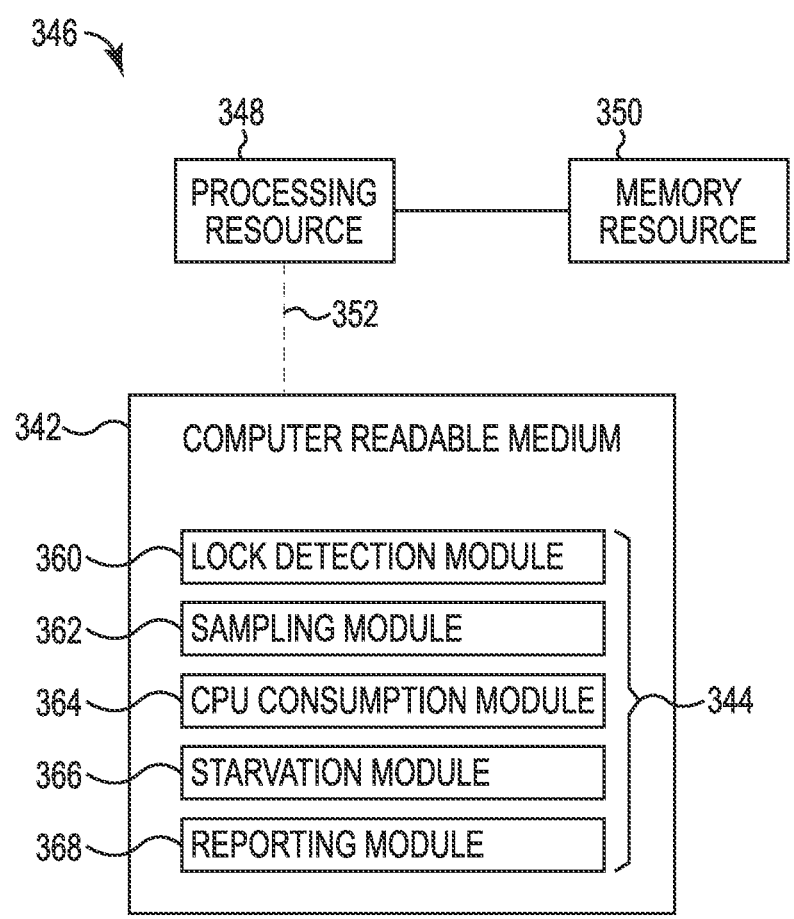
FIG. 3 illustrates a diagram of an example computing device according to the present disclosure.

FIG. 3 illustrates an example computing device 346 according to the present disclosure. The computing device 346 can utilize software, hardware, firmware, and/or logic to perform a number of functions.

The computing device 346 can be a combination of hardware and program instructions configured to perform a number of functions. The hardware, for example, can include one or more processing resources 348, computer readable medium (CRM) 342, memory resource 350, etc. The program instructions, e.g., computer-readable instructions (CRI) 344, can include instructions stored on the CRM 342 to implement a desired function, e.g., determine thread starvation.

The processing resources 348 can be in communication with the tangible non-transitory CRM 342 storing the set of CRI 344 executable by one or more of the processing resources 348, as described herein. The CRI 344 can also be stored in remote memory managed by a server and represent an installation package that can be downloaded, installed and executed. The computing device 346 can include memory resources 350, and the processing resource 348 can be coupled to the memory resource 350.

Processing resource 348 can execute CRI 344 that can be stored on internal or external non-transitory CRM 342. The processing resource 348 can execute CRI 344 to perform various functions, including the functions described with respect to FIG. 1 and FIG. 2, among others.

The number of modules 360, 362, 364, 366, and 368 can include CRI 344 that when executed by the processing resource 348 can perform a number of functions. The number of modules 360, 362, 364, 366, and 368 can be sub-modules of other modules. For example, a lock detection module 360 and a sampling module 362 can be sub-modules and/or contained within a single module. Furthermore, the number of modules 360, 362, 364, 366, and 368 can comprise individual modules separate and distinct from one another.

A lock detection module 360 can comprise CRI 344 and can be executed by the processing resource 348 to detect a thread entering and exiting a lock. The lock detection module 360 can detect and report the amount of time the thread was not runnable due to being in a lock by detecting when a thread enters and exits a lock. The lock detection modules can implement lock detection using instrumentation at the process-level.

A sampling module 362 can comprise CRI 344 and can be executed by the processing resource 348 to sample a thread at periodic intervals to determine the thread state. The thread state that is determined by sampling the thread at periodic intervals can be used to estimate the amount of time a thread is not runnable due to its thread state.

A CPU consumption module 364 can comprise CRI 344 and can be executed by the processing resource 348 to determine an amount CPU consumption time for a thread. The amount of CPU consumption time for a thread can be determined from the runtime environment, such as the OS and/or a Java virtual machine, for example. The Java API can be used to monitor and report the amount of CPU consumption time for a thread.

A starvation module 366 can comprise CRI 344 and can be executed by the processing resource 348 to determine the amount of thread starvation for a thread. The amount of thread starvation can be determined by subtracting the amount of time a thread is not runnable and the amount of CPU consumption time for a thread over a particular time period from the total elapsed time of the particular time period.

A reporting module 368 can comprise CRI 344 and can be executed by the processing resource 348 to report the amount of thread starvation for a thread. The amount of thread starvation for each thread of a number of threads can be reported as a unit of time and/or as a percentage of time. The reporting module 368 can also report information such as the time, day, month, and year that thread starvation occurred.

A non-transitory CRM 342, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 342 can be integral or communicatively coupled to a computing device in a wired and/or wireless manner. For example, the non-transitory CRM 342 can be an internal memory, a portable memory, and a portable disk, or a memory associated with another computing resource, e.g., enabling CRIs 344 to be transferred and/or executed across a network such as the Internet.

The CRM 342 can be in communication with the processing resource 348 via a communication path 352. The communication path 352 can be local or remote to a machine, e.g., a computer, associated with the processing resource 348. Examples of a local communication path 352 can include an electronic bus internal to a machine, e.g., a computer, where the CRM 342 is one of volatile, non-volatile, fixed, and/or removable storage medium in communication with the processing resource 348 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 352 can be such that the CRM 342 is remote from a processing resource, e.g., processing resource 348, such as in a network connection between the CRM 342 and the processing resource, e.g., processing resource 348. That is, the communication path 352 can be a network connection. Examples of such a network connection can include local area network (LAN), wide area network (WAN), personal area network (PAN), and the Internet, among others. In such examples, the CRM 342 can be associated with a first computing device and the processing resource 348 can be associated with a second computing device, e.g., a Java® server. For example, a processing resource 348 can be in communication with a CRM 342, wherein the CRM 342 includes a set of instructions and wherein the processing resource 348 is designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for monitoring thread starvation comprising:
    determining an amount of time each thread of a number of threads is not runnable by using stack trace sampling to estimate a thread state for each thread of the number of threads,
        wherein stack trace sampling includes sampling each thread of the number of threads by reading a topmost stack frame of each thread of the number of threads;

determining an amount of CPU consumption time for each thread of the number of threads;

determining an amount of thread starvation time for each thread of the number of threads by subtracting from a total elapsed time the amount of time each thread of the number of threads is not runnable and the amount of CPU consumption time for each thread of the number of threads; and reporting the amount of thread starvation time.

2. The method of claim 1, wherein determining the amount of time each thread of the number of threads is not runnable includes determining an amount of time each thread of the number of threads is in a lock.

3. The method of claim 1, wherein determining the amount of time each thread of the number of threads is not runnable includes estimating a state of each thread of the number of threads using stack trace sampling.

4. The method of claim 1, wherein the method includes using stack trace sampling at periodic intervals to estimate the state of each thread of the number of threads.

5. The method of claim 1, wherein the method includes determining a time and date when thread starvation occurs for each thread of the number of threads.

6. The method of claim 1, the method includes reporting the amount of thread starvation time as a percentage of the total elapsed time.

7. A non-transitory machine-readable medium storing instructions for monitoring thread starvation executable by a computer to cause the computer to:

determine an amount of time each thread of a number of threads is not runnable by using stack trace sampling to estimate a thread state for each thread of the number of threads and instrumentation to detect lock operations for each thread of the number of threads, wherein stack trace sampling includes sampling each thread of the number of threads by reading a topmost stack frame of each thread of the number of threads;

determine an amount of CPU consumption time for each thread of the number of threads;

determine an amount of thread starvation for each thread of the number of threads by subtracting from a total elapsed time the amount of time each thread of the number of threads is not runnable and the amount of CPU consumption time for each thread of the number of threads; and report the amount of thread starvation time.

8. The medium of claim 7, wherein the instructions executable to determine an amount of CPU consumption time for each thread of the number of threads include instructions to use a JAVA API for determining the amount of CPU consumption time.

9. The medium of claim 7, wherein the instructions are further executable to determine the amount of time each thread of the number of threads is not runnable by using stack trace sampling to estimate thread state of each thread of the number of thread at periodic intervals.

10. The medium of claim 7, wherein the instructions are further executable to determine the amount of thread starvation for each thread of the number of threads as percentage of the total elapsed time.

11. The medium of claim 7, wherein the instructions are further executable to determine the amount of thread starvation for each thread of the number of threads by adding an amount of time each thread of the number of threads is missing a sample from the thread stack sampling.

12. A system for monitoring thread starvation, comprising:
a processing resource;
a non-transitory computer-readable medium coupled to the processing resource; and
a memory resource coupled to the processing resource, the processing resource configured to execute a set of instructions on the non-transitory computer-readable medium, the set of instructions executable to:
determine an amount of time each thread of a number of threads is not runnable by using stack trace sampling to estimate a thread state for each thread of the number of threads and instrumentation to detect lock operations for each thread of the number of threads,
wherein stack trace sampling includes sampling each thread of the number of threads by reading a topmost stack frame of each thread of the number of threads;
determine an amount of CPU consumption time for each thread of the number of threads;
determine an amount of thread starvation for each thread of a number of threads by subtracting from a total elapsed time the amount of time each thread of the number of threads is not runnable and the amount of CPU consumption time for each thread of the number of threads; and
report the amount of thread starvation time.

13. The system of claim 12, wherein the instructions to determine the amount of the thread starvation for each thread of the number of threads includes determining the amount of thread starvation during the total elapsed time and expressing the amount of thread starvation as a percentage of the total elapsed time.

14. The system of claim 12, wherein the instructions are further executable to determine the amount of thread starvation for each thread of the number of threads by adding an amount of time each thread of the number of threads is missing a sample from the stack trace sampling.

* * * * *